United States Patent [19]
Pritchard et al.

[11] Patent Number: 4,830,311
[45] Date of Patent: May 16, 1989

[54] GUIDANCE SYSTEMS

[76] Inventors: Alan J. Pritchard; John D. Stanley, both of British Aerospace PLC, Dynamics Group, Six Hills Way, Stevenage, Hertfordshire, SG1 2AS, England

[21] Appl. No.: 5,311
[22] Filed: Jan. 16, 1987

Related U.S. Application Data

[63] Continuation of Ser. No. 698,856, Nov. 23, 1984, abandoned.

[30] Foreign Application Priority Data
Nov. 25, 1983 [GB] United Kingdom ............... 8331591

[51] Int. Cl.$^4$ ............................................. F41G 7/22
[52] U.S. Cl. ................................ 244/3.15; 102/384
[58] Field of Search .................. 244/3.15, 3.16, 3.19, 244/3.21; 102/384, 377

[56] References Cited

U.S. PATENT DOCUMENTS

| | | | |
|---|---|---|---|
| 4,123,019 | 10/1978 | Amberntson | 244/3.16 |
| 4,396,878 | 8/1983 | Cole et al. | 244/3.15 |
| 4,417,520 | 11/1983 | Maudal | 102/384 |
| 4,508,293 | 4/1985 | Jones | 244/3.15 |
| 4,522,356 | 6/1985 | Lair et al. | 244/3.15 |
| 4,557,437 | 12/1985 | Seidensticker et al. | 244/3.21 |

FOREIGN PATENT DOCUMENTS 2308903 11/1976 France ............................ 102/377

OTHER PUBLICATIONS

Garnell, P. and East, D. J., "Homing Heads and Some Associated Stability Problems", *Guided Weapon Control Systems*, Pergamon Press, 1980, Chaper 8, pp. 185–197.

*Primary Examiner*—Charles T. Jordan
*Attorney, Agent, or Firm*—Cushman, Darby & Cushman

[57] ABSTRACT

When a homing head or seeker is mounted on-board a missile, the inertial reference provided by the seeker may be contaminated to some extent by the motion of the missile body. To alleviate this, seekers are sometimes gimballed and use rate or position gyros or they may be momentum-stabilized—the seeker itself providing the inertial reference. However, gyros are both complex and expensive, and momentum-stabilized seekers tend to have large inertias making it difficult to achieve high scan rates. The guidance system described herein allows the establishment of inertial references via information derived from a seeker which need not be isolated from the missile body, the seeker having a range measuring function which, possibly in combination with one or more accelerometers, is used to control pitch, yaw, roll and stabilization of the missile.

4 Claims, 10 Drawing Sheets

GUIDANCE SYSTEMS

This is a continuation of application Ser. No. 698,856, filed Apr. 12, 1985, which was abandoned upon the filing hereof.

FIELD OF THE INVENTION

This invention relates to guidance systems for a vehicle such as a guided weapon and more particularly to active or semi-active guided missiles (which term includes all kinds of launched or fired devices for example terminally-guided bombs, shells, rockets, air-to-air missiles and so on).

SUMMARY OF THE INVENTION

According to one aspect of the invention there is provided a guidance system for use on-board a vehicle such as a missile, guided bomb or the like, and comprising range sensing means and control and guidance means which is operable for supplying control signals which cause the range sensing means to make available respective signals indicative of the range, measured in different directions, between the range sensing means and a fixed reference, such as the ground beneath the vehicle, and which is further operable, on the basis of a comparison between said control signals and the range indicative signals, for effecting roll control of the vehicle.

According to a second aspect of the invention, there is provided a guidance system for use on-board a vehicle such as a missile, guided bomb or the like, and comprising a gimbal-mounted target seeker, drive means for moving the target seeker relative to the vehicle, control means for receiving taret sightline error signals from the seeker and for controlling said drive means to maintain a sightline to a target and, to maintain base motion decoupling of the seeker, first and second pairs of accelerometers providing control inputs to said control means respectively indicative of vehicle body rate in yaw and pitch planes at different positions of the vehicle body.

According to a third aspect of the invention, there is provided a guidance system for use on-board a vehicle such as a missle, guided bomb or the like and comprising accelerometers for providing signals indicative of vehicle body rates at two spaced positions in each of the pitch and yaw planes of the vehicle, said guidance system being operable for using said signals along with the output from a scanning target seeker to provide guidance information relating to vehicle body rate, vehicle flight path and target sightline rate and enabling proportional navigation of the vehicle.

According to a fourth aspect of the invention, there is provided a weapon adapted for being launched along a ballistic trajectory descending over an area containing a possible target, the weapon comprising an on-board scannable target seeking means having a range measuring capability and control and guidance means which is operable, using ground range measurements by said target seeking means, for guiding the weapon into stabilised flight along a less than ballistically descending path, for causing the target seeking means to search for and track a target, and for guiding the weapon to impact said target.

When a homing head is mounted on a missile framework, the inertial reference provided by the head is contaminated to some extent by the 'base' motion of the missile body. To alleviate this, homing heads (seekers) are gimballed and rate or position gyros are embodied in the seeker head. Alternatively, momentum-stabilised seekers, where the seeker itself provides an inertial reference, can be used. Momentum-stabilised seekers tend to have large inertias and therefore high scan rates are difficult to achieve. Meanwhile gyros are complex and expensive. A description of the prior art seekers and their use in missiles employing proportional navigation is to be found in "Guided Weapon Control Systems" by P. Garnell and D. J. East (published by Pergamon press).

It will be seen that the guidance and control system particularly described herewith reference to the drawings allows the establishment of inertial sightline rates via information derived from a seeker which need not be isolated. Further, this guidance and control system does not comprise any gyros.

BRIEF DESCRIPTION OF THE DRAWINGS

For a better understanding of the invention, reference will now be made, by way of example, to the accompanying drawings in which.

DETAILED DESCRIPTION OF THE PRESENTLY PREFERRED EMBODIMENT

The description which follows concerns a terminally-guided mortar bomb incorporating a target seeker having a range measuring function. It will be appreciated that this is not limitative of the invention, and is applicable to other situations particularly other kinds of weapon such as air-to-air guided missiles and so on. The use of a radar target seeker is described but other kinds of seekers could be substituted perhaps in alliance with some auxiliary range measuring device if the seeker is not inherently capable of this. If a range measuring function is not available, the invention is still applicable although then it may be desirable to obtain a missile or bomb velocity estimate by some other means, for example from a programmed-in knowledge of the missile characteristics and a look-up table say, and if the bomb or missile is to be roll-stabilised then some kind of datum may be needed, for example a roll-gyro.

Provision of a range measuring function is preferred since, then, roll control, pitch and yaw control and stabilisation, and seeker base-motion decoupling can be provided without the use of gyros and/or inertia members. However, reduction of the overall number of gyros otherwise needed is also useful. For example, as described, roll control is carried out by measuring ground range and if this is inconvenient, and there is no other convenient fixed reference which can substitute for the ground (this might be the case with an air-to-air missile say), then some separate roll control system might be needed. However, use of appropriate aspects of the invention could still be applied say to attitude stabilisation and/or target seeker decoupling.

The described system effects roll-position control but modifications achieving roll rate control will be clear to those skilled in the art.

The terminally-guided mortar bomb to be described, which bomb is not itself shown in detail, comprises an active radar homing head including a transmission/reception dish antenna which can be moved with respect to the bomb body so as to trace out certain scanning patterns as described later. The bomb also includes deployable flying control surfaces and an electronic control and guidance system, operable to control the radar homing head and, on the basis of signals received from the homing head, to control the final phase of the flight of the bomb.

Figure 1:
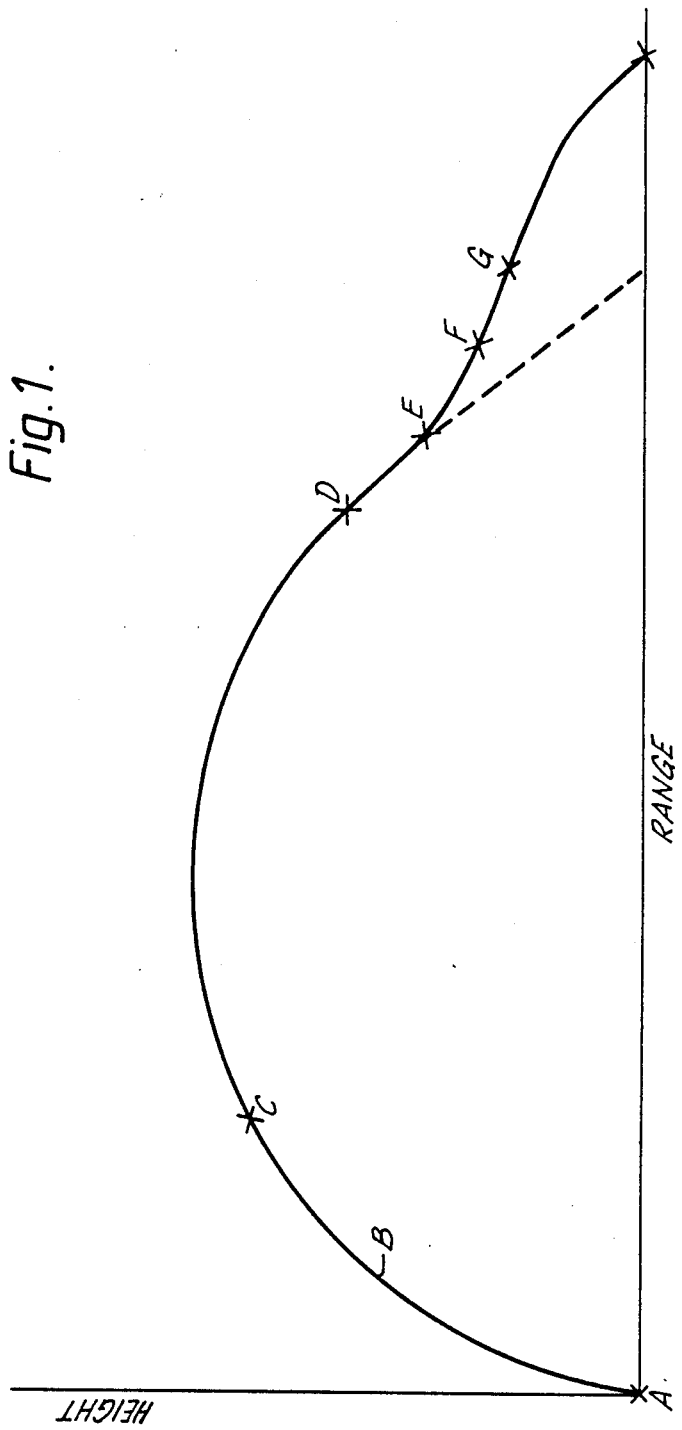
FIG. 1 is a diagram illustrating the trajectory and stages of operation of a terminally-guided mortar bomb.
Figure 2:
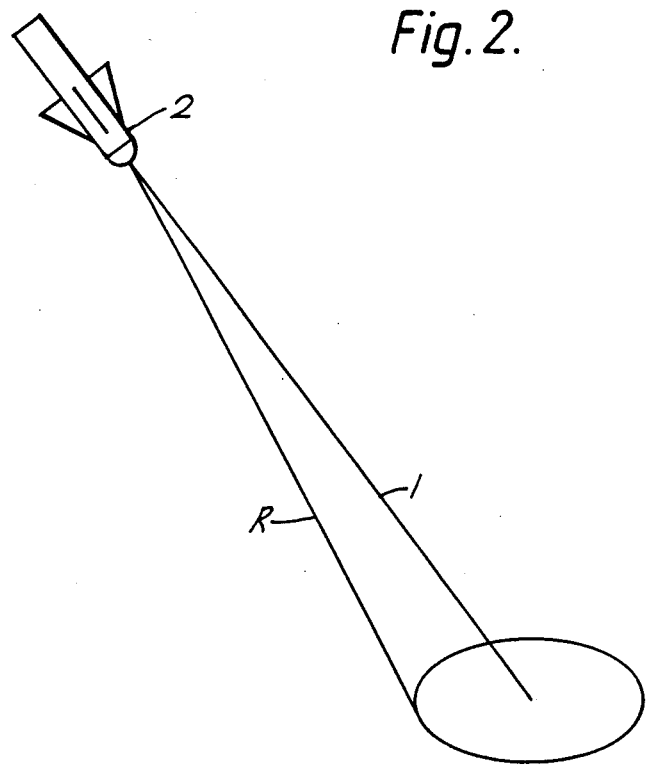
FIG. 2 is a diagram illustrating the way in which a target seeker on-board the bomb executes a conscan and how this permits roll control of the bomb.

Referring to FIG. 1, the bomb is said to be terminally-guided because, following launch from position A, for most of its flight, it is unguided and simply follows a ballistic trajectory B. However, after some predetermined time following launch, say when the bomb has reached position C, the on-board control electronics renders the radar homing head active and carries out any necessary initialisation procedures associated with the homing head. The head is then made to produce a fixed transmission beam directed forwardly along the roll axis of the bomb. At some point after the bomb has begun to descend towards the ground, say at position D, the homing head will begin to receive a ground clutter return beam from which the control electronics can make a range-to-ground measurement. The flying control surfaces of the bomb are then deployed and the guided phase of the flight commences. The first task carried out during this guided phase is to roll-position stabilise the bomb. This is performed by causing the homing head dish to so move that the transmission beam traces out a so-called conscan pattern, ie movement around the periphery of a conical figure extending forwardly around the roll-axis 1 of the bomb 2 as shown in FIG. 2. Thus, the point at which the beam intersects the ground moves around an oval locus centred agbout the point at which the roll-axis 1 intersects the ground. As it so moves, the range signal formed by the control is effected by comparing the phase of this range signal with the phase of a signal indicative of the position of the radar dish relative to the bomb body.

Once roll-position stabilisation is achieved, say by the time the bomb has reached position E in FIG. 1, the dish of the radar homing head begins to move so as to trace out a more complex conscan pattern comprising the previous relatively fast, narrow angle coning movement (perhaps at 100 Hz and with about a 1° half-angle) superimposed on a slower, wider angle coning movement (say at 5 Hz and with 5° half-angle). As will be described, this makes available to the bomb a signal which can be used to its pitch angle and enables it to be pulled out of its ballistic trajectory and into some less steeply descending path, say at 45° to the ground, the object being to increase the range of the bomb and extend the area for target detection with the desired search path achieved, say at position F in FIG. 1, the homing head beam is made to trace out some suitable target search scan pattern, in the present case a linear raster scan, covering an approximately rectangular ground area forward of the bomb. If desired, the search phase could be a multi-stage process involving for example, respective wide area raster scans during which moving targets are sough (and in the absence of a moving target, seeking any fixed targets), and then possibly further scans over a smaller area.

Once a target is acquired, say by position G, the homing head and guidance electronics operate in the usual homing made, ie the radar beam executes a narrow, fast conscan pattern, the same as the initial 100 Hz, 1° pattern for example, centred on and following the sightline to the target while the bomb is guided according to some chosen proportional navigation law to impact. For best effectiveness against certain targets, the chosen law is preferably such as to achieve a descent path onto the target of at least a predetermined minimum steepness.

Figure 3:
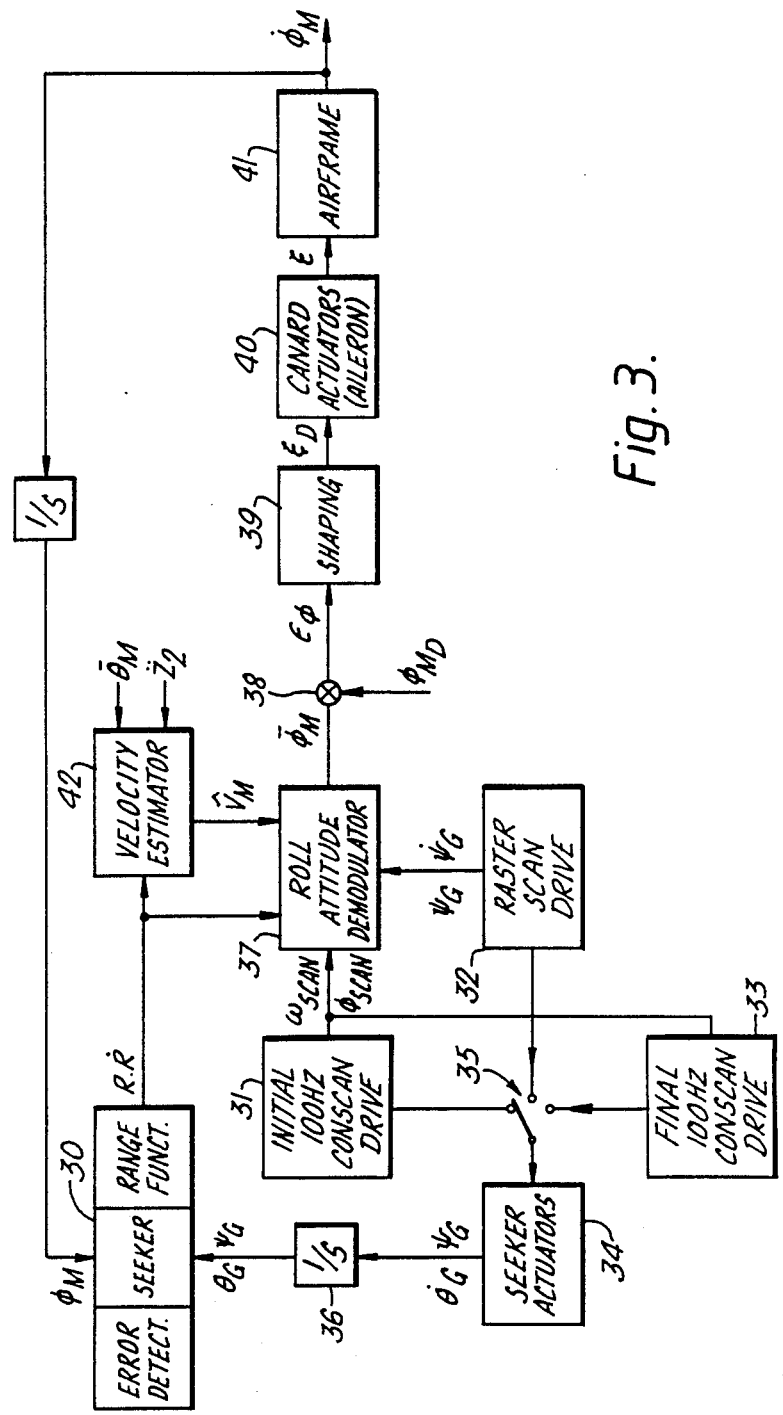
FIGS. 3 to 8 are respectively block diagrams illustrating the functions carried out by a control and guidance system on board the bomb.

As will be appreciated, the respective functions of roll-position stabilisation, attitude stabilisation, target tracking and guidance to target impact, are carried out by the control and guidance electronics on board the bomb. The control and guidance electronics will be described with the aid of flow diagrams illustrating the functions which occur in the respective 'loops'. FIG. 3 is the diagram for the roll-position control of the bomb. In the figure, the block 30 represents the homing head or seeker along with its associated circuits for providing range measurement signals and target slightline error signals. Only the range measuring function is used for roll control. The three main seeker scanning modes, ie the initial 100 Hz conscan, the raster scan and the final 100 Hz conscan are represented by three scan-drive blocks, 31, 32 and 33 respectively, connected to the seeker actuator motors 34 via a 3-position switch 35. The outputs of the actuator motors 34 are the seeker gimbal rates, relative to the bomb body, in yaw and pitch, $\dot{\psi}_G$ and $\dot{\theta}_G$ respectively. Block 36 represents the effective integration of these rates which is carried out by the seeker to produce yaw and pitch gimbal angles $\psi_G$ and $\theta_G$ repesenting the seeker-axis angle relative to the bomb body.

So far as roll control is concerned, the operation is identical during both the initial and final conscan modes. The conscan drive scan frequency, $\omega_{SCAN}$, and phase, $\phi_{SCAN}$, pass from the drive 31 (or 32) to a roll attitude demodulator 37 where they are compared with the frequency and phase of the ground range return signals (which signals vary as the seeker scans about the inclined roll-axis of the bomb as described with reference to FIG. 2). For a correctly roll-oriented bomb, ie with the seeker gimbal pitch axis in a vertical plane, the maximum range will be measured when the seeker is at maximum elevation while minimum range will occur when the seeker is at maximum depression relative to the bomb roll-axis. A difference in frequency between the range return signal and $\omega_{SCAN}$ gives a measure of bomb roll rate while the difference in phase between the range return signal and $\phi_{SCAN}$ gives the roll-position angle. This measured roll-position angle is output as signal $\phi_M$ from the demodulator 37 and the difference between it and a demanded roll angle $\phi_{MD}$ is provided by differing unit 38 as roll-position error signal $\epsilon_\phi$. This error signal passes into a conventional loop (shaping circuits 39, control surface actuators 49, bomb body or airframe 41), firstly to reduce the roll rate and kill the roll, then to roll orientate and then to maintain the body roll stabilised. The demanded roll angle $\phi_{MD}$ may comprise a small fixed bias value to take account of any expected phase error in the system, particularly in the demodulator 37.

During the raster scan mode of the seeker, roll stabilisation is again maintained by the demodulator 37 on the basis of range measurement signals from the seeker although, in addition, there is required an estimate of the bomb velocity. As the seeker scans in azimuth, the measured range reduces from a first value down to a minimum while the beam moves from one end of the raster line to a position in which the beam moves towards the other end of the raster line. The range R will approximate to $$\frac{h}{\cos(\psi + \phi_M)}$$

where h is the minimum range measurement during the line scan, ie the range to the ground while the beam lies in a vertical plane, $\phi_M$ is the angle between the vertical plane including the bomb and the plane containing the beam when it is at the centre of its azimuth scan, ie the bomb roll angle, $\psi_G$ is the instant azimuth angle of the beam relative to its central position. Thus, $$\left(\frac{\dot{R}}{R}\right) = \left(\frac{\dot{h}}{h}\right) + \tan(\psi_G + \phi)(\dot{\psi}_G + \dot{\phi})$$

This expression is approximated by the simplified expression:

$$\left(\frac{\dot{R}}{R}\right) = \left(\frac{-V_M}{R}\right) + (\dot{\psi}_G + \dot{\phi})\psi_G$$

From which, $$\phi \approx \left(\frac{\dot{R} + V_M}{R\dot{\psi}_G}\right) - \psi_G \tag{1}$$

The roll attitude demodulator 37 obtains $\phi_M$ by solving equation (1) using the values R and $\dot{R}$ supplied by the seeker, $\psi_G$ and $\dot{\psi}_G$ supplied by the raster scan drive 32, and an estimate $\hat{V}_M$ of the bomb velocity, which estimate is derived by computing block 42 the range and range rate measurements R and $\dot{R}$ supplied by the seeker and from values of the pitch acceleration $\ddot{Z}_2$ measured at the centre of gravity of the bomb and the measured body pitch attitude $\theta_M$. These values $\ddot{Z}_2$ and $\theta_M$ are supplied to the computing block 42 by separate measuring means described later. The roll angle $\phi_M$ is again passed to differing unit 38 but it may be that the predicted phase error in the demodulator 37 will now be different to that expected during the initial conscan phase. If so, $\phi_{MD}$ is changed as appropriate. Possibly the predicted phase error in the raster scan mode is zero so $\phi_{MD}$ can be made zero also, and $\epsilon\phi = \phi_M$.

During the final conscan mode, the roll stabilisation function is exactly the same as in the initial conscan mode except that, possibly, the predicted phase error by demodulator 37 is different and a correspondingly different value of phase demand $\phi_{MD}$ requires to be applied to differing unit 38.

As will be realised, the roll control function as described involves some minor approximations. However, since roll angle accuracy only to within some allowed limit, say ±5°, is generally required, the function as described will usually be satisfactory. It will be appreciated also that the described methods are strictly correct only for a smooth, flat ground surface. Ground irregularities will have the greatest effect during the raster scan mode. They can be mitigated to some extent by averaging of the range measurements over some chosen short time period, say about 0.2 second. The effect of ground slope across the seeker axis would be to introduce a roll error—even so, the significance of this error on terminal accuracy should normally be small.

Figure 4:
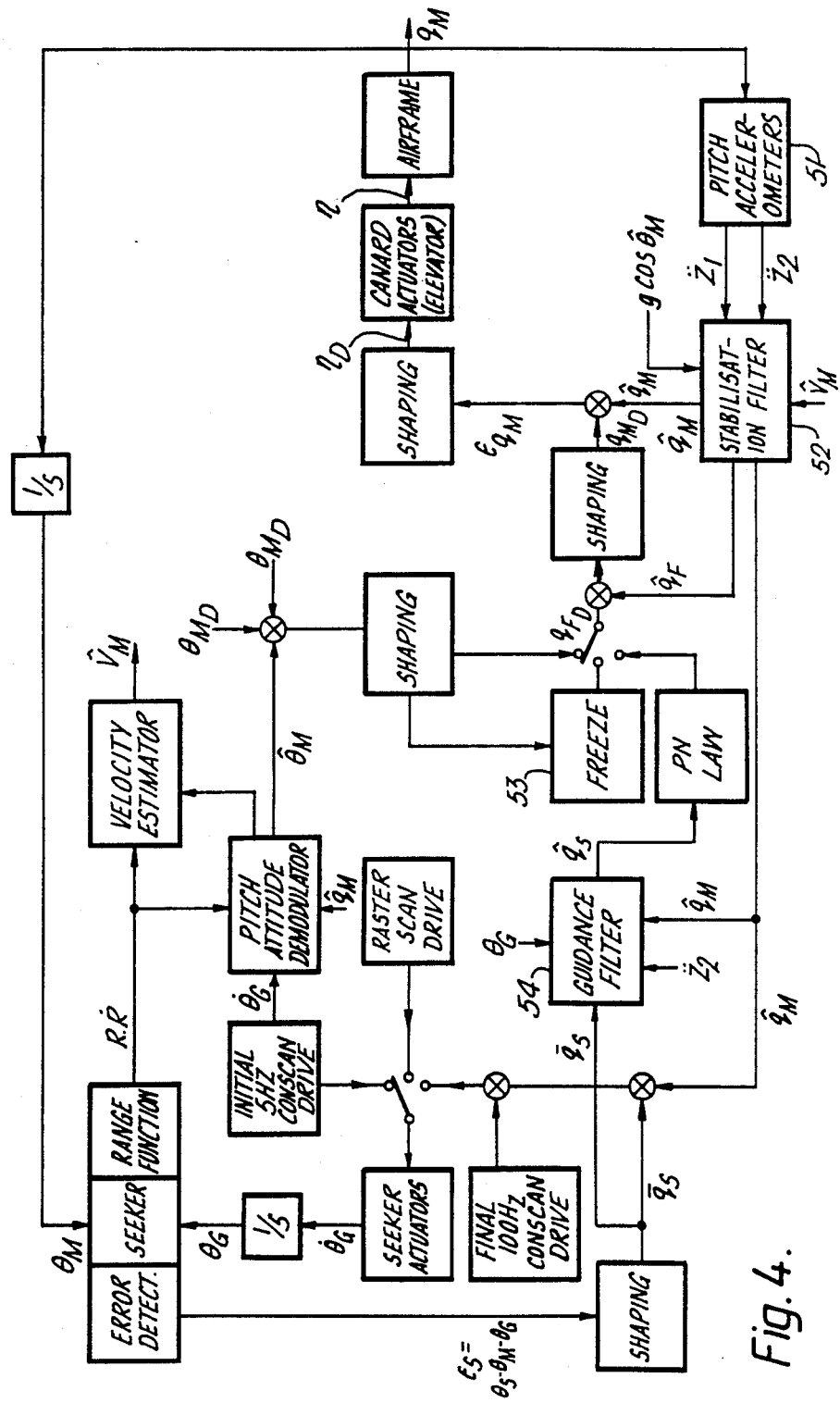

FIG. 4 illustrates the functions which ae carried out as part of the pitch attitude control executed by the guidance electronics. Like FIG. 3, FIG. 4 is a composite diagram, respective combinations of the blocks therein being relevant to each of the three pitch guidance modes or stages, ie during the stage immediately following roll-position stabilisation when the 5 Hz wide angle conscan with the 100 Hz narrow angle conscan superimposed thereon is being executed, during the raster scan stage, and lastly during the final 100 Hz conscan or guidance to target stage. Three guidance roles are carried out. Initially, the pitch attitude has to be controlled so that the bomb pulls from its ballistic trajectory into the desired target seeking trajectory at, say, 45° to the horizontal. A normal autopilot function then has to be carried out stabilising the pitch first to maintain the target seeking path and then according to the demands made by the target impact navigating system. Thirdly, since the homing head dish or seeker is not space referenced, the guidance electronics have to perform the role of decoupling the seeker from the bomb body motion or 'base' motion, ie in effect, to stabilise the target sightline in space.

The second and third roles are also carried out in respect of the yaw plane and the means for carrying this out will be appreciated from the following description of the pitch plane stabilisation (with appropriate modifications clear to those skilled in the art of course—for example no gravity compensation is required in the yaw plane).

Two sensing devices are used for pitch control, the seeker (through its error detection and ranging functions), and a pair of accelerometers are provided. As in FIG. 3, the stages of controlled flights are represented by 3-position switches this time two of them, each representing the initial 5 Hz conscan period
the raster scan search stage
the final 100 Hz conscan used during full guidance.

Figure 5:
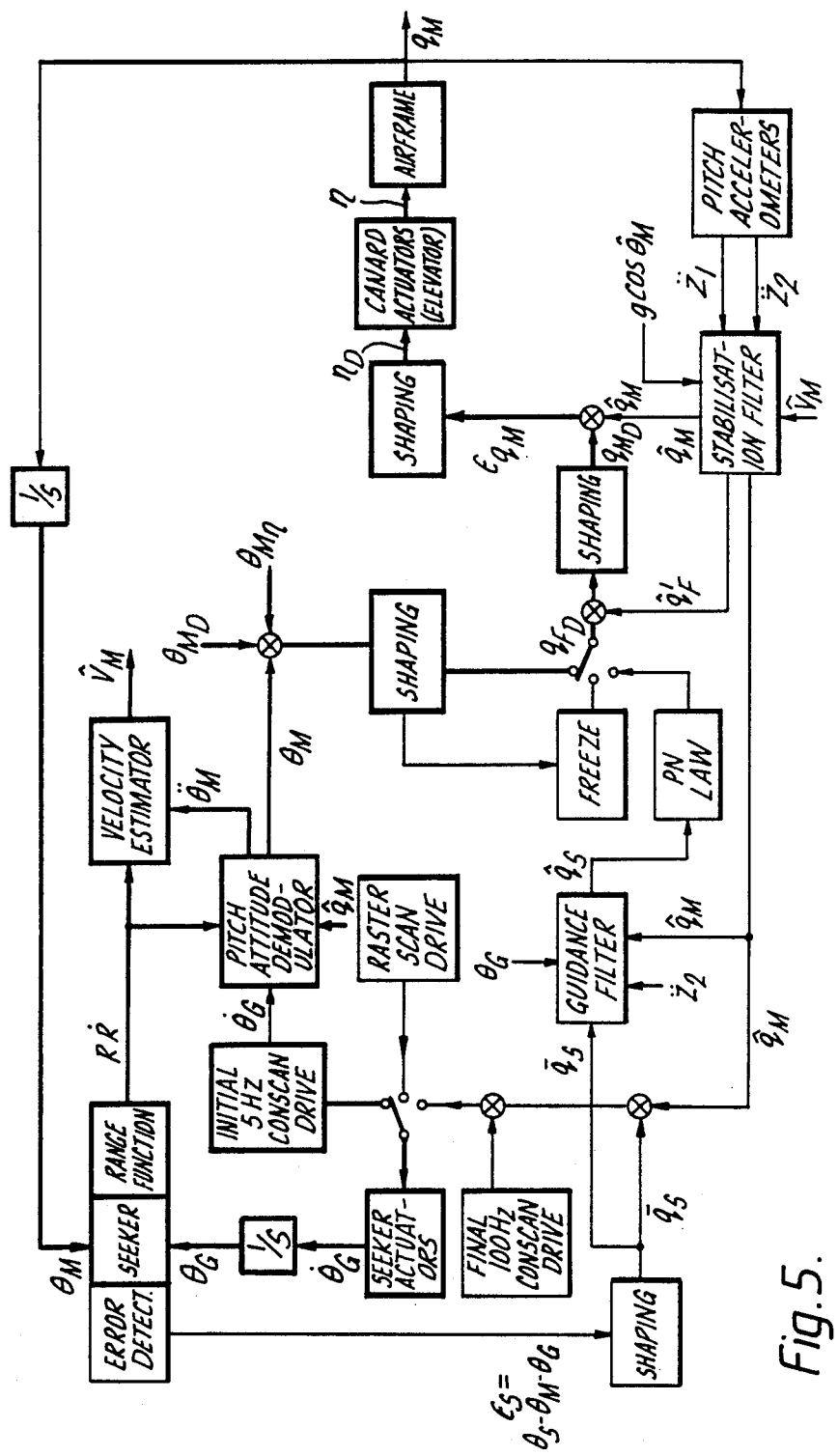
Figure 6:
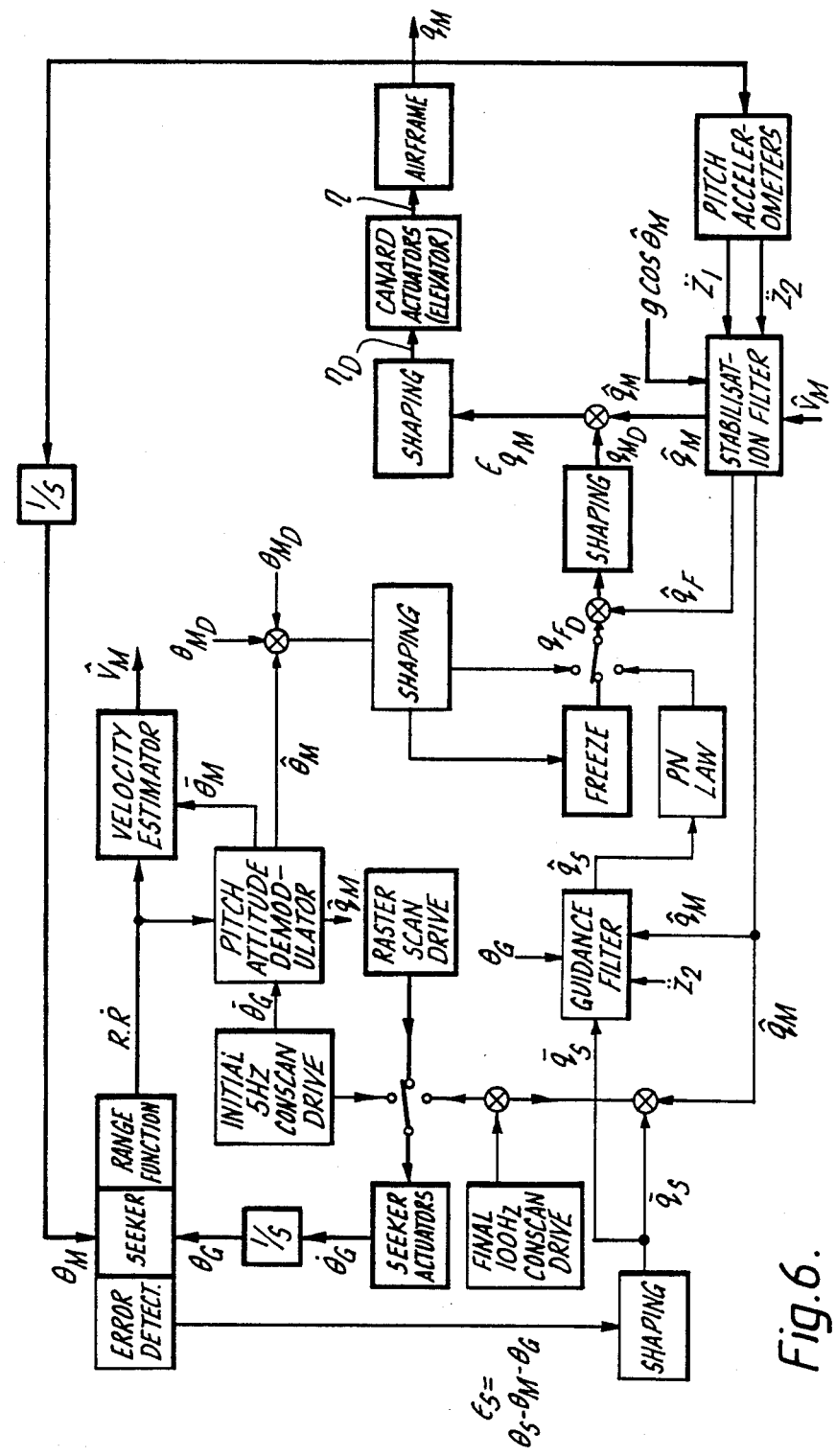
Figure 7:
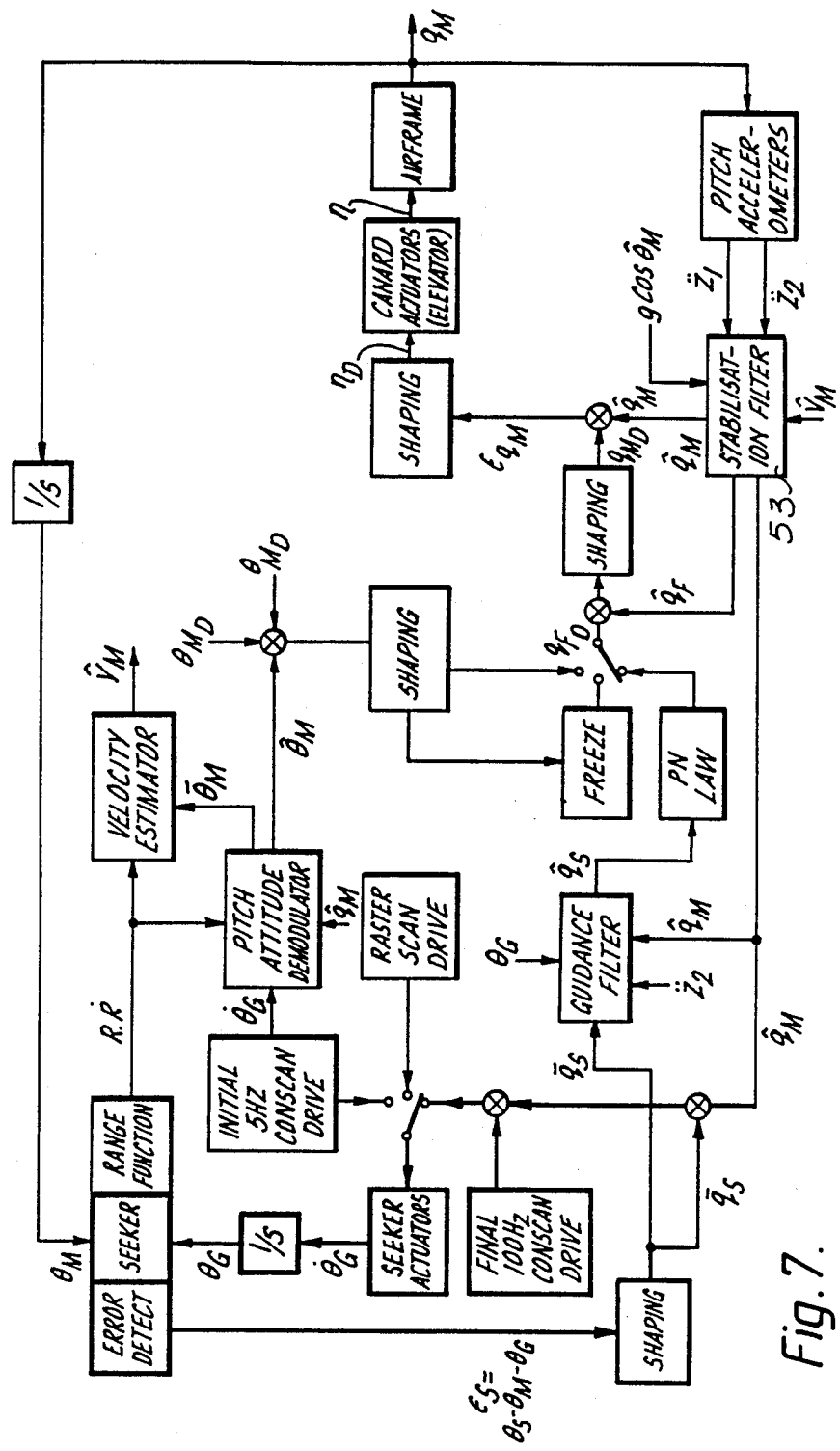
Figure 8:
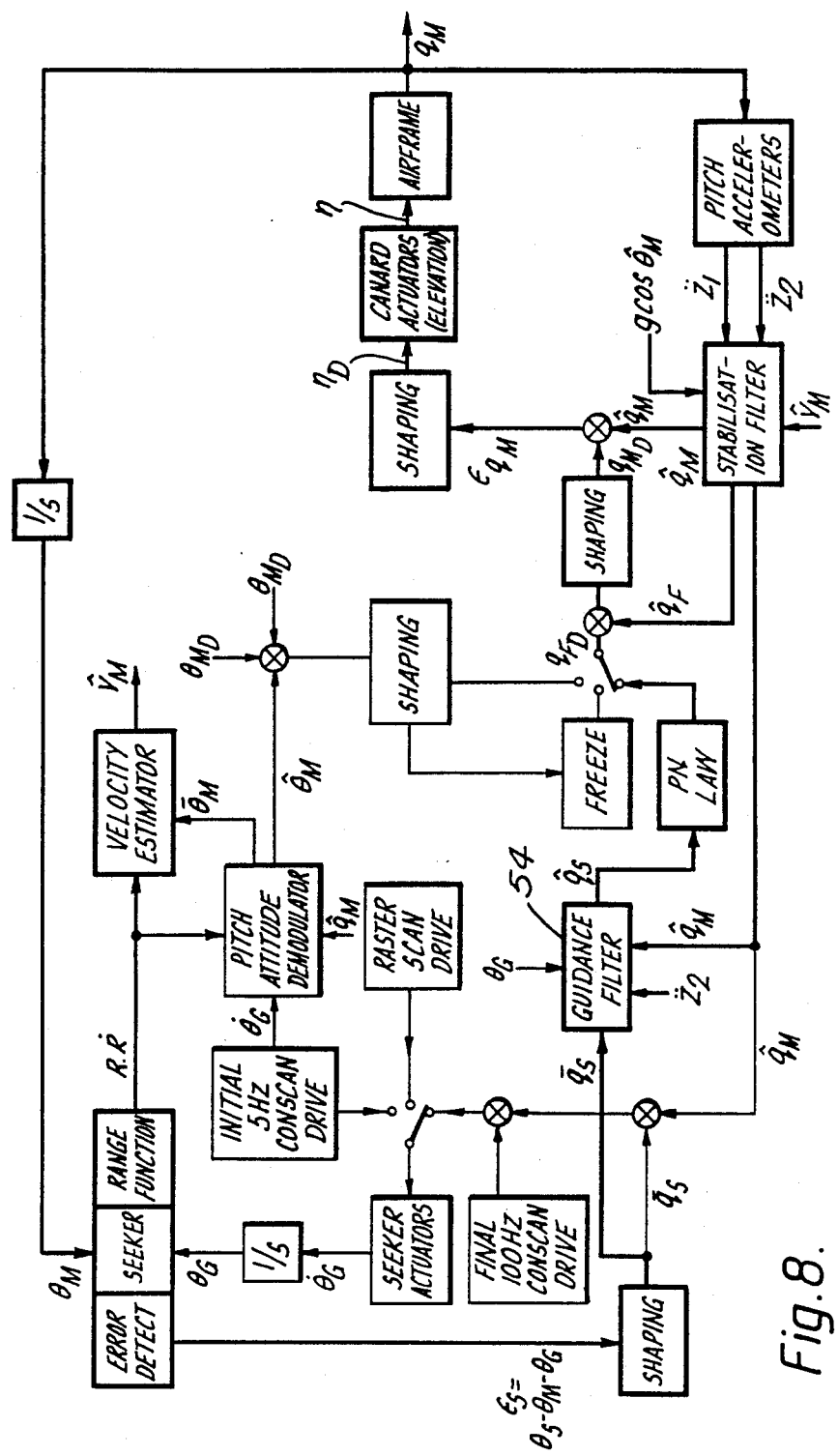
Figure 9:
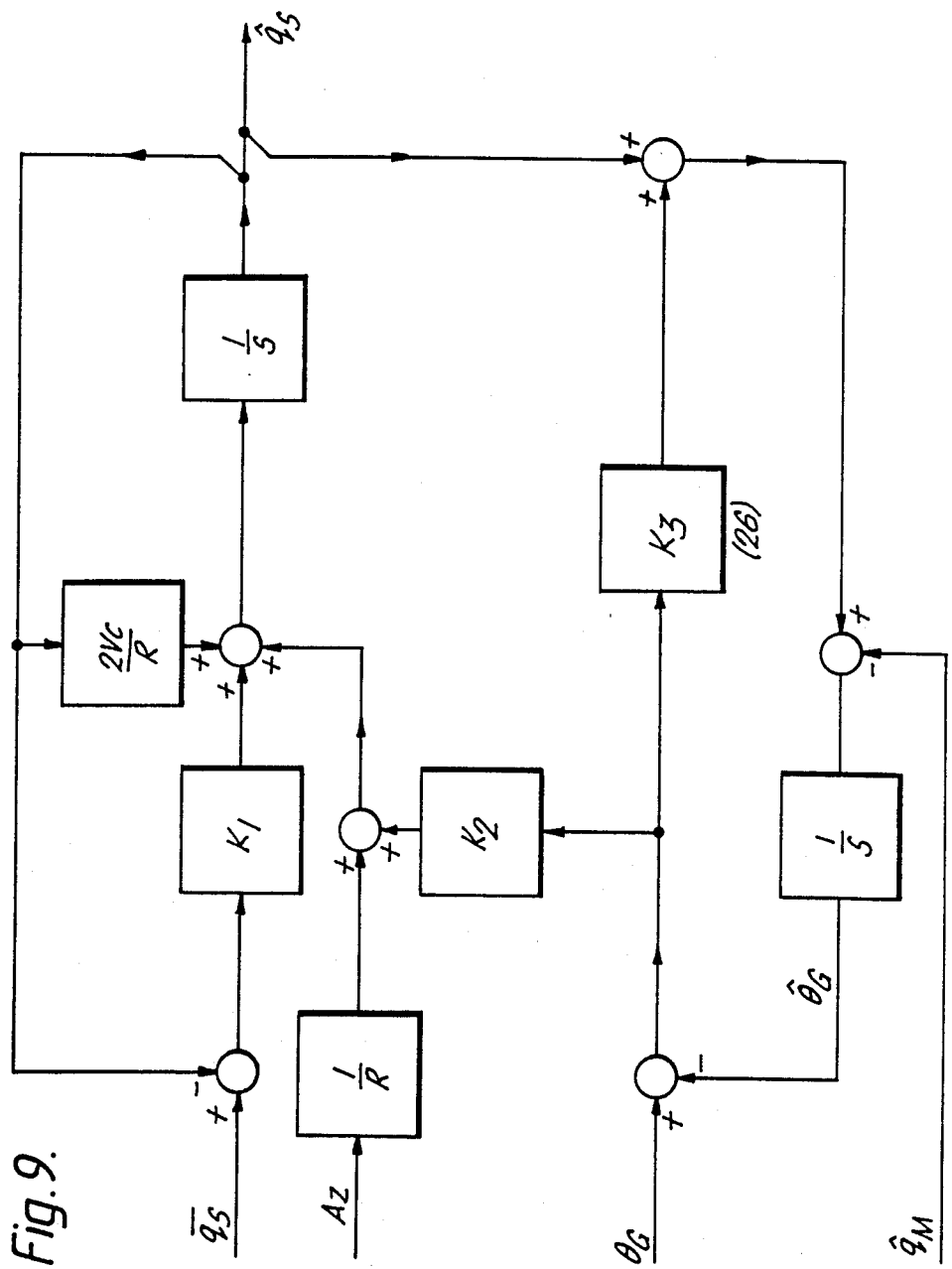
FIGS. 9 and 10 are respective block diagrams of a guidance filter and a stabilisation filter used in the bomb guidance system.

FIGS. 5 and 6 are each identical to FIG. 4 except that, in them, the function blocks and flow paths relevant to respective ones of the first two of the three stages listed above are drawn in thick lines. FIGS. 7 and 8 are also identical to FIG. 4 and these show, by thick lines, the blocks and paths relevant to the third stage (final conscan). FIG. 7 however relates to the function of guiding the seeker to maintain the target straightline while FIG. 8 relates to the bomb guidance function.

Initially (FIG. 5), the seeker is being driven at the 5 Hz, 5° semi-angle slow conscan (which is superimposed on the 100 Hz conscan for roll control), and the outputs of the seeker ranging function are used by the pitch attitude demodulator together with the pitch scan rates to obtain two indicators of body attitude. The first is a 'measurement', relying upon the significant differences obtained in measured range at the upper and lower points in the scan. The bomb is at this stage roll-stabilised, with the seeker pitch axis vertical, and so the upper and lower points in the scan correspond to extremes of beam deflection in pitch. The measured bomb attitude $\bar{\theta}_M$ is of course digital, because of the finite time taken to scan. The second output produced by the pitch attitude demodulator is an estimated pitch attitude $\hat{\theta}_M$, which is a modification of the measured value to take account of body pitch rate during the scan, and to smooth it. The final estimate, $\hat{\theta}_M$, is subtracted from the demand attitude, ie the 45° target seeking attitude, and the difference used to generate elevation deflections to control and stabilise the airframe attitude.

As mentioned during the description of FIG. 3, a measure of body attitude is needed by computing block 42 to compute bomb velocity, for use in roll stabilisation, filtering networks, and a variation of shaping functions. The estimate $\hat{\theta}_M$ cannot be used since it is derived using body rate information, itself estimated using estimated velocity. Instead the measured value $\bar{\theta}_M$ is used.

The approximate equation for the solution of body attitude is $$\theta_M = \tan^{-1}\left[\frac{\Delta q_M - 2\dot{\theta}_{Gmax}}{(\dot{R}/R)_{max} - (\dot{R}/R)_{min}}\right]$$

where max and min values correspond to extremes of the azimuth component of scan.

The response of the airframe to the demand for pitch attitude stabilisation is improved by the use of a rate autopilot, with rate feedback being obtained using a pair of accelerometers 51. In the absence of instrument biasses, two accelerometers can provide information on lateral acceleration and body angular rate; however, mismatches in biases and scale factors have to be compensated for, and this is carried out in a 3-state observer network, the stabilisation filter 52. This filter, which requires the estimate of bomb velocity as an input, includes gravity compensation and provides estimates of both body angular rate and flight path rate.

At the start of target search phase (FIG. 6), the input from the pitch attitude demand loop is frozen at its last value (block 53). This provides connection for any biasses existing in the elevator servos or accelerometers, and assists the rate autopilot loop to maintain the bomb pitch attitude at its initial value.

In yaw, the rate autopilot maintains yaw angle constant, so that if the bomb is drifting in a crosswind, the raster scan pattern will exhibit a lateral shift at each elevation step.

At the point of target detection, during the previous phase, the seeker axis was stopped at the target position. The final 100 Hz conscan is now started, and the seeker detects the error between seeker axis and true target sightline in the classical conical scan manner. As shown in FIG. 7, this error is used to drive the seeker gimbal to follow the target, and therefore provides, after shaping, a measure of the true target sightline rate $\hat{q}_s$. To obtain a rate demand to the seeker gimbal with respect to the bomb body, the motion of the bomb body must be decoupled since the seeker is not a space-referenced device, and this is done by substracting the estimated body rate (output of the stabilisation filter 53), from the sightline measured rate. The result, to which is added the 100 Hz conscan drive, provides the drive signal to the seeker actuators.

The seeker motion is thus 'stabilised' by an estimated correction term, and although the stabilisation will not be perfect, the errors will be continuously updated. More importantly, the stabilising input is not influenced by the imperfections—it is estimated from body acceleration inputs and entirely divorced from seeker motion.

The bomb guidance loop during the terminal guidance phase (FIG. 8) utilises proportional navigation (PN) to ensure good performance against moving targets, and is biassed in elevation to steepen the descent angle onto the target. The PN equation, $\dot{q}_F = k\dot{q}_s$, requires sightline rate as the input; the measured sightline rate signal may contain significant noise components which make it unsatisfactory as a guidance input. This noise is filtered out in a guidance filter 54 (FIG. 8), which uses state observer techniques to produce a new estimate of sightline rate, making allowance for body acceleration and gimbal angle (rather than gimbal rate, the measurement of which contains biasses), and also the estimate of body rate obtained from the stabilisation filter. Depending upon the application and the amount of noise expected in the sightline rate signal, the filter 54 may not be necessary or possibly it could be replaced by a relatively low-pass filter.

The estimates sightline rate $\hat{q}_s$, factored by the PN constant becomes the demanded flightpath rate, and this enters the full autopilot loop, in which estimates of flightpath and body rate are used to stabilise the motion. These rates are obtained from the stabilisation filter which during this stage, uses R as a close approximation to $V_M$.

Rate bias and demand limiting are included in the shaping networks.

The yaw PN law does not include rate bias, but in other respects the yaw loop is identical.

Figure 10:
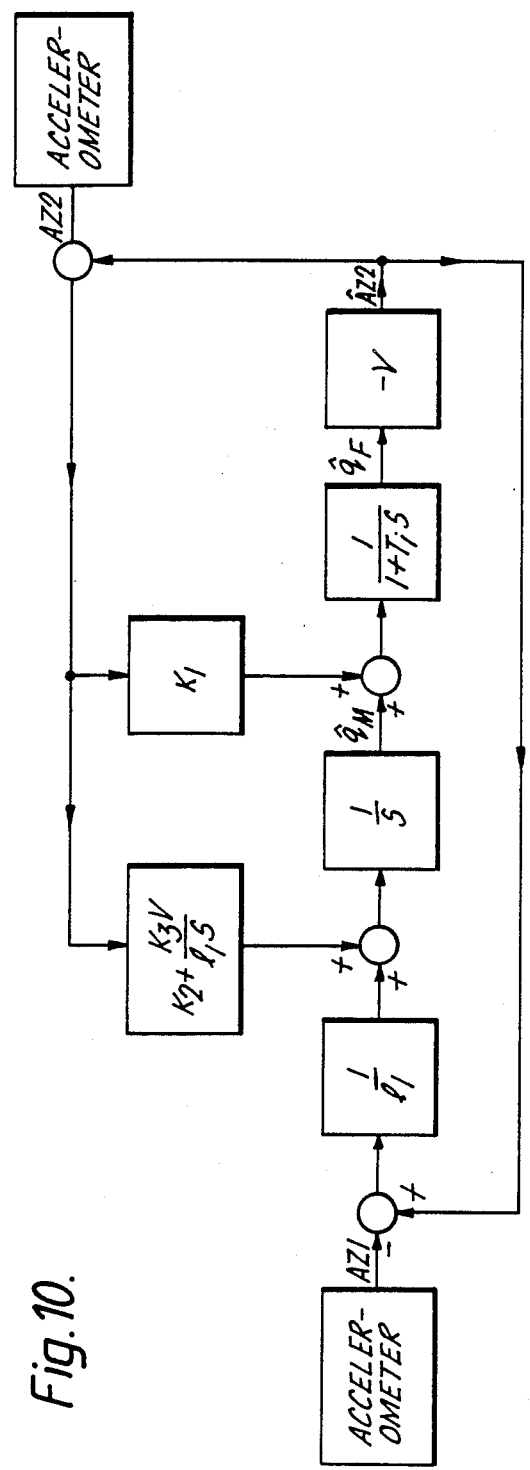

A block diagram for the stabilisation filter 52 is shown in FIG. 10 where $l_1$ is the separation distance of the two accelerometers shown. Body rate will give rise to a higher output from one of the accelerometers both of which will give similar outputs for changes in missile velocity. Mismatches in biasses and scale factors are compensated for in this network.

We claim:

1. A guidance system for use on-board a vehicle such as a missile, guided bomb or the like, and comprising:
   range sensing means; and
   control and guidance means for (a) supplying control signals which cause the range sensing means to make available respective signals indicative of the range, measured in different directions, between the range sensing means and a fixed reference, and (b) for effecting roll control of the vehicle on the basis of a comparison between said control signals and the range indicative signals, said control and guidance means including accelerometer means.

2. A guidance system for use on-board a vehicle such as a missile, guided bomb or the like, comprising:
   a gimbal-mounted target seeker;
   drive means for moving the target seeker relative to the vehicle;
   control means for receiving target sightline error signals from the seeker and for controlling said drive means to maintain a sightline to a target and to maintain motion decoupling of the seeker and vehicle; and
   first and second pairs of accelerometers providing control inputs to said control means respectively indicative of vehicle body rate in yaw and pitch planes at different positions of the vehicle body.

3. A guidance system for use on-board a vehicle such as a missile, guided bomb or the like and comprising accelerometers for providing signals indicative of vehicle body rates at two spaced positions in each of the pitch and yaw planes of the vehicle, said guidance system being operable for using said signals along with the output from a scanning target seeker to provide guidance information relating to vehicle body rate, vehicle flight path and target sightline rate and enabling proportional navigation of the vehicle.

4. A weapon adapted for being launched along a ballistic trajectory descending over an area containing a possible target, comprising;
an on-board scannable target seeking means having a range measuring capability; and
control and guidance means which is operable, using ground range measurements made by said target seeking means, for guiding the weapon into stabilised flight along a less than ballistically descending path, for causing the target seeking means to search for and track a target, and for guiding the weapon to impact said target, said control and guidance means including accelerometer means.

* * * * *